United States Patent Office 3,135,663
Patented June 2, 1964

3,135,663
VACCINES
Peter William Muggleton, Northwood, James Alfred Richard Dudley, Harrow, and Valerie Constance Gonzalez Bellido, formerly Thomas, Chertsey, England, assignors to Glaxo Group Limited, Middlesex, England, a British company
No Drawing. Filed June 12, 1961, Ser. No. 116,295
Claims priority, application Great Britain June 28, 1960
10 Claims. (Cl. 167—79)

This invention is concerned with improvements in or relating to the production of B.C.G. vaccine.

B.C.G. vaccine is now used in various countries on an increasing scale for immunisation against tuberculosis and comprises a viable culture of an attenuated bovine tubercle bacillus termed "bacillus of Calmette and Guerin" from which the abbreviation "B.C.G." derives.

A major problem with B.C.G. vaccine is the securing of a vaccine containing a sufficient number of viable organisms at the time of inoculation. One method that has proved of particular value for the storage of B.C.G. vaccine is that of freeze-drying the vaccine, which is then conveniently stored in ampoules. To protect the organisms it has been proposed to carry out the freeze-drying in the presence of a variety of protectant media, which media have been designed to increase the survival rate of the organisms during freeze-drying. However, it has generally not been possible to store freeze-dried B.C.G. vaccine for any substantial period at ambient temperatures, particularly in the warmer countries, and generally the vaccine is best stored at refrigerator temperautres. The low stability of freeze-dried B.C.G. vaccine gives rise to considerable practical difficulties in use. It is thus an object of the invention to provide a freeze-dried B.C.G. vaccine of improved storage stability.

We have now found that the nature of the medium in which the bacillus is cultivated is of considerable importance for the production of freeze-dried B.C.G. vaccine of improved stability on storage. Thus whereas much attention has been paid to the nature of the protecting medium in which the vaccine is freeze-dried, we have found that instability is in part due to substances present in the culture medium in which the organisms are grown, and carried over into the freeze-dried product. In particular we find that for the production of a freeze-dried B.C.G. vaccine of improved viability upon storage the culture medium employed should be such that it neither contains aldehydic substances, nor contains substances which, during the culture process, are converted into aldehydes, and in addition contains no other component which is converted into a substance resulting in inactivation of the organisms.

In the commercial production of B.C.G. vaccine good growth and hence high yields have been considered essential and the media used have contained an abundant source of carbon and energy, glycerol and/or glucose having been generally used for this purpose. Glucose is of course an aldehyde and we have found that glycerol appears to be converted to an aldehyde, so that although vigorous growth of B.C.G. may take place in media containing these substances, the subsequent viability of the organisms after freeze-drying is impaired.

In the submerged culture of B.C.G. it is customary for the culture medium to contain a non-ionic wetting agent. Here too we have found that it is desirable to choose a wetting agent that, although itself non-inhibitory to the growth of the organism, is not converted into a substance that is growth-inhibitory or toxic to the organism.

According to the invention, we provide a process for the production of freeze-dried B.C.G. vaccine in which B.C.G. organisms are cultured in a nutrient medium therefor and thereafter freeze-dried, characterised in that said medium is one substantially free from glycerol, monosaccharides, sugar alcohols and polysaccharides containing a carbonyl group or metabolised by the organisms to carbonyl group-containing compounds. Where a wetting agent is used e.g. in submerged culture such agent is preferably a non-hydrolysable non-ionic wetting agent. Preferably the medium is one wherein the essential nitrogen and carbon requirements of the organism are provided by amino acids, polypeptides, and/or protein hydrolysates.

The process according to the invention is preferably conducted in submerged culture and the medium thus preferably contains at least one amino acid and/or an enzymatic digest of casein and/or a meat protein hydrolysate and/or a meat extract, a non-hydrolysable non-ionic wetting agent, preferably a polyoxyethylene ether of a long-chain alcohol, such as nonyl, cetosteryl or lauryl alcohol, a buffer to maintain a pH between about 5.5 and 8.5, preferably about pH 7, and small amounts of the nutrient salts required by the organism (e.g. salts of iron, calcium, zinc and copper). The buffer system is conveniently provided by disodium hydrogen phosphate/ potassium dihydrogen phosphate. The culture medium preferably contains L-asparagine as an amino-acid, and may also contain monosodium glutamate and/or L-glutamine.

The organisms are generally inoculated into the medium at a temperature of 35° to 39° C., preferably 37° C., and preferably incubated for a period of 8 to 21 days, after which the culture produced is conveniently separated from the liquid medium by centrifugation. The organisms may then be re-suspended in a freeze-drying medium, freeze-dried, and sealed in ampoules under vacuum. Numerous media in which B.C.G. vaccine may be suspended prior to freeze-drying have been proposed. Such media include for example aqueous solutions or suspensions of one or more of the following: dextran, lactose, sucrose, glucose, gelatine, peptone, sodium glutamate, horse serum etc., dextran solutions being particularly preferred by us.

Freeze-drying of the organisms may be carried out in any convenient manner, for example as described in U.S. Patent No. 2,908,614. According to this patent organisms are freeze-dried in admixture with an aqueous dextran solution, the aqueous material to be dried preferably containing from 1 to 10% w/v. of dextran. A nonionic wetting agent of the type described in the aforesaid specification is preferably also present, a particularly suitable wetting agent being that known under the trade name Triton WR1339. To prevent "over-drying" the dextran preferably also contains a substance which retains water, e.g. glucose (for example 7.5% glucose added to a 10% dextran solution). It should be noted that the presence of glucose or glycerol in the freeze-drying adjuvant solution, as distinct from the culture medium in which the organisms are grown, does not appear to have a deleterious effect on the organisms. The addition of mono sodium glutamate may also be advantageous. The actual process of freeze-drying is well-known, but may, for example, be effected as described in Patent No. 2,908,614.

The following examples illustrate the improved viability and stability on storage of B.C.G. vaccine grown in media free from nutrients which yield substances toxic to the organism.

EXAMPLE 1

To show the adverse effect of glucose and glycerol in culture media upon freeze-dried B.C.G. vaccine, 100 ml. volumes of three culture media were inoculated with a 1% suspension of a 7 days old B.C.G. culture (in Dubos' medium). The culture media were as follows:

A. Sauton medium (modified):

| L-asparagine | g-- | 4 |
| Glycerol | ml-- | 40 |
| Citric acid | g-- | 2 |
| $K_2HPO_4$ | g-- | 0.5 |
| $MgSO_4$ | g-- | 0.5 |
| Ferric ammonium citrate | g-- | 0.05 |
| Triton 1/20 | ml-- | 5 |

Aq. dist. to 1 litre.
pH 7.2.

B. Dubos' liquid medium:

| L-asparagine | g-- | 2.0 |
| Enzymatic digest of casein (Bacto Casitone) | g-- | 0.5 |
| $Na_2HPO_4$ | g-- | 2.5 |
| $K_2HPO_4$ | g-- | 1.0 |
| Ferric ammonium citrate | g-- | 0.05 |
| $MgSO_4$ | g-- | 0.01 |
| $CaCl_2$ | mg-- | 0.5 |
| $ZnSO_4$ | mg-- | 0.1 |
| $CuSO_4$ | mg-- | 0.1 |
| Tween 80 | g-- | 0.2 |
| Water | ml-- | 900 |

After sterilisation of this, 100 ml. of 5% bovine albumin and 100 ml. 7.5% glucose are added to each litre of medium.

C. Dubos' liquid medium: As in B, but omitting glucose and albumin, and adding 0.5% of a meat protein hydrolysate (Peptone Oxo).

After 10 days' incubation at 37° C. the capacity of each culture was measured on a Hilger Spekker photoelectric absorptiometer (0.425, 0.27 and 0.19 for A, B and C respectively).

10 ml. of each culture were centrifuged at 2000 r.p.m. for 30 minutes. The supernatant fluid was almost completely discarded and the cell deposit resuspended in freeze-drying medium containing bovine albumin fraction V 5%, sucrose 7.5%, sodium glutamate 1% Triton WR1339 being added to a final concentration of 1/4000.

0.1 ml. of each suspension was filled into ampoules which were immediately frozen in the refrigerator cabinet for 2 hours at −50° C. After this the ampoules were transferred to a freeze-drying machine and dried overnight (approximately 20 hours) to a final vacuum of 0.02 mm. Hg. Secondary drying was carried out, after hand constricting the ampoules, on a manifold over phosphorus pentoxide for 4 hours. The ampoules were sealed off under vacuum at 0.015 mm. Hg.

Survival at 100° C. in Boiling Water Bath

The ampoules were dropped into a boiling water bath and two of each batch were withdrawn at the noted times. Duplicate viability counts on each were performed, after diluting in Sauton-Triton solution, on oleic acid albumin agar+10% blood in Petri dishes. The colonies were counted after 14 days' incubation, in polythene bags, at 37° C.

Results (1) SURVIVAL AT 100° C.

| Minutes | Viable cells$\times 10^6$ | | |
|---|---|---|---|
| | A | B | C |
| 0 (control) | 1.54 | 3.12 | 3.94 |
| 2 | <0.001 | 0.005 | ∞ |
| 4 | <0.001 | 0.002 | ∞ |
| 6 | <0.001 | 0.001 | ∞ |
| 10 | <0.001 | 0.00029 | ∞ |
| 15 | <0.001 | 0.00013 | ∞ |

∞ Indicates colonies too numerous to count accurately at the dilution used.

(2) STORAGE AT 37° C. FOR 5 MONTHS

Viable cells:
| A | 0.017×$10^6$ |
| B | 0.0064×$10^6$ |
| C | 0.16×$10^6$ |

EXAMPLE 2

B.C.G. vaccine was cultured on an improved medium according to the invention, freeze-dried in three different adjuvant solutions, and the viability of the vaccine determined after storage for periods of 6–24 weeks.

Culture medium:

| Mono sodium glutamate | g-- | 4 |
| L-asparagine | g-- | 4 |
| Enzymatic digest of casein (Bacto Casitone) | g-- | 1 |
| $Na_2HPO_4$ | g-- | 2.5 |
| $KH_2PO_4$ | g-- | 1 |
| Ferric ammonium citrate | mg-- | 100 |
| Calcium chloride | mg-- | 1 |
| Zinc sulphate | mg-- | 0.2 |
| Copper sulphate | mg-- | 0.2 |
| Triton WR1339 | ml-- | 0.5 |

Aq. dist. to 2 litres.
pH 7.2.

Method

The medium was distributed in 100 ml. amounts in mould culture flasks and sterilised in the autoclave under 10 lb. pressure for 15 minutes. 10 ml. of 5% meat protein hydrolysate (Oxo peptone) in distilled water sterilised by Seitz filtration was added to each flash before inoculation. 5 x 100 ml. amounts were inoculated with 1% of a 7 days old culture of B.C.G. grown on Dubos' medium and incubated at 37° for 12 days. The average photoelectric absorptiometer reading was 0.26 giving an equivalent of 0.91 mg./ml. moist weight of cells.

The medium was centrifuged at 2000 r.p.m. for 35 minutes and after decantation of the supernatant fluid again at 1000 r.p.m. for 10 minutes. The resulting deposit of cells was resuspended in three different freeze-drying media the opacity equivalents of each being determined. 0.5 ml. of each was filled into ampoules, and these were frozen in the refrigerator cabinet at −50° C. for 90 minutes. The batches were transferred to the desiccator, and dried overnight. After hand constriction, batches A and B were secondarily dried for 22 hours, the final vacuum being 0.03 mm. Hg. Batch C was dried for 1 hour, the final vacuum being 0.03 mm. Hg. All the ampoules were sealed off under the stated vacuum.

The batches were divided into 2 equal portions, one being stored at 37° C. and one at 4° C. Suspension counts and viable counts on 2 ampoules were carried out in duplicate using dilution in Sauton-Triton, oleic acid albumin agar+10% blood, colonies being enumerated after 18 days incubation at 37° C. in polythene bags. Moisture contents were determined by the vapour pressure method on a micromoisture determination apparatus.

The three freeze-drying solutions used were:

A

| | |
|---|---|
| Dextran | 8.3% |
| Glucose | 7.5% |
| Triton | 1/4000 |

B

| | |
|---|---|
| Dextran | 5% |
| Sucrose | 7.5% |
| Sodium glutamate | 1% |
| Triton | 1/4000 |

C

| | |
|---|---|
| Dextran | 2% |
| Sodium glutamate | 2% |
| Triton | 1/4000 |

Results

| | Vaccine | | |
|---|---|---|---|
| | A | B | C |
| Mg. moist weight per ampoule | 0.6 | 0.6 | 0.5 |
| Suspension count | 54.7×10⁶ | 49×10⁶ | 36.8×10⁶ |
| Moisture content, percent | 1.25 | 1.13 | 2.21 |
| Viable count after freeze drying | 19×10⁶ | 14.6×10⁶ | 8.8×10⁶ |
| Percent survival | 66.2 | 59.6 | 47.8 |

STORAGE TRIALS AT 4° C. and 37° C.

| | Viable cells×10⁶ | | | | | |
|---|---|---|---|---|---|---|
| Weeks | A | | B | | C | |
| | 4° C. | 37° C. | 4° C. | 37° C. | 4° C. | 37° C. |
| 6 | 17.3 | 7.28 | 13.6 | 8.78 | 7.95 | 3.62 |
| 12 | 17.1 | 6.45 | 13.3 | 4.7 | 7.3 | 2.7 |
| 18 | * | 2.9 | * | 1.3 | * | 1.52 |
| 24 | 16.5 | 1.63 | 12.2 | 0.52 | 6.15 | 0.36 |

* Indicates not tested.

*To Examine the Efficiency of the Vaccine in Guinea Pigs*

Groups of albino guinea pigs, 6 in a group, were vaccinated intradermally with 0.1 ml. of neat B.C.G. vaccines A, B and C, each stored at 4° C. or 37° C. for 24 weeks. The animals were tuberculin tested by the intradermal injection of 10 T.U. of Old Tuberculin and their vaccination lesions measured at 14 and 28 days after vaccination.

Example 3

*Investigation of the Importance of Sodium Glutamate in the Culture Medium*

A

| | |
|---|---|
| Mono sodium glutamate | g __ 4 |
| L-asparagine | g __ 4 |
| Enzymatic digest of casein (Bacto Casiton) | g __ 1 |
| Na₂HPO₄ | g __ 2.5 |
| KH₂PO₄ | g __ 1 |
| Ferric ammonium citrate | mg __ 100 |
| CaCl₂ | mg __ 1 |
| CuSO₄ | mg __ 0.2 |
| ZnSO₄ | mg __ 0.2 |
| Meat protein hydroylsate (Peptone Oxo) | g __ 20 |
| Triton 1/20 | ml __ 10 |

Aq. dist. to 2 litres.
pH 7.2.

B

| | |
|---|---|
| L-asparagine | g __ 4 |
| Enzymatic disgest of casein (Bacto Casitone) | g __ 1 |
| Na₂HPO₄ | g __ 2.5 |
| KH₂PO₄ | g __ 1 |
| Ferric ammonium citrate | mg __ 100 |
| CaCl₂ | mg __ 1 |
| CuSO₄ | mg __ 0.2 |
| ZnSO₄ | mg __ 0.2 |
| Meat protein hydrolysate (Peptone Oxo) | mg __ 20 |
| Triton 1/20 | ml __ 10 |

Aq. dist. to 2 litres.
pH 7.2.

*Method*

The media were distributed in 100 ml. quantities in mould culture flasks and sterilised in the autoclave under 10 lbs. pressure for 15 minutes.

10 x 100 ml. amounts of each medium were inoculated with 1% of a B.C.G. culture aged 1 week. After 14 days the growth was centrifuged at 2000 r.p.m. for 35 minutes and the deposit resuspended in the following drying media:

A

| | |
|---|---|
| Dextran | 8.3% |
| Glucose | 7.5% |
| Triton | 1/4000 |

B

| | |
|---|---|
| Dextran | 5% |
| Sucrose | 7.5% |
| Triton | 1/4000 |

C

| | |
|---|---|
| Dextran | 5% |
| Sucrose | 7.5% |
| Sodium glutamate | 1% |
| Triton | 1/4000 | making six batches in all identified as AA, AB, AC, BA, BB and BC, the first letter indicating the type of culture medium and the second letter indicating the drying medium.

| Storage | | Days after vaccination | Lesion diameter (mm.) in Guinea Pig No.— | | | | | | Av. | Tuberculin reaction diameter (mm.) in Guinea Pig No.— | | | | | | Av. |
|---|---|---|---|---|---|---|---|---|---|---|---|---|---|---|---|---|
| | | | 1 | 2 | 3 | 4 | 5 | 6 | | 1 | 2 | 3 | 4 | 5 | 6 | |
| A | 4° C. | 14 | 8 | 8 | 7.5 | 6.5 | 7 | 6 | 7.2 | 7 | 7 | 10 | 10 | 7 | 10 | 8.5 |
| | | 28 | 8 | 7.5 | 7.5 | 5.5 | 7 | 7 | 6.1 | 15 | 13 | 14 | 14 | 15 | 12 | 14 |
| | 37° C. | 14 | 6 | 7 | 5.5 | 7.5 | 7 | 8 | 6.8 | 8 | 7 | 5 | 7 | 3 | 3 | 5.5 |
| | | 28 | 6 | 5 | 7 | 6 | 5 | 7 | 6.0 | 13 | 14 | 9 | 11 | 13 | 9 | 11.5 |
| B | 4° C. | 14 | 7 | 8 | 7.5 | 7.5 | 6.5 | 7.5 | 7.3 | 4 | 5 | 8 | 12 | 8 | 7 | 7.3 |
| | | 28 | 7.5 | 7 | 7.5 | 6.5 | 7 | 6.5 | 7.0 | 12 | 12 | 8 | 18 | 11 | 7 | 11.3 |
| | 37° C. | 14 | 5.5 | 7 | 5 | 7 | 6 | 7 | 6.2 | 6 | 6 | 3 | 6 | 8 | 8 | 6.2 |
| | | 28 | 5 | 4.5 | 6 | 4.5 | 6 | 4.5 | 5.1 | 11 | 13 | 14 | 12 | 8 | 11 | 11.5 |
| C | 4° C. | 14 | 7 | 7 | 8 | 7.5 | 7 | 8 | 7.4 | 7 | 6 | 7 | 10 | 10 | 6 | 7.7 |
| | | 28 | 5.5 | 7 | 8 | 6 | 7 | 7 | 6.7 | 10 | 13 | 13 | 14 | 11 | 13 | 12.3 |
| | 37° C. | 14 | 6.5 | 5.5 | 6 | 5.5 | 6 | 5 | 5.6 | 3 | 5 | 6 | 6 | 4 | 5 | 4.8 |
| | | 28 | 6 | 6.5 | 5 | 4 | 4 | 4 | 4.9 | 11 | 7 | 8 | 10 | 10 | 11 | 9.5 |

0.5 ml. of each was filled into ampoules, which were deep frozen at −50° C. for 90 minutes. They were freeze-dried overnight for 16 hours with a final vacuum 0.05 mm. Hg. Secondary drying over $P_2O_5$ was continued overnight for 22 hours. The final vacuum was 0.025mm. Hg. The ampoules were sealed off under vacuum.

The batches were divided into two equal portions, one was stored at 4° C. and one at 37° C.

Viable counts were carried out on suspension in duplicate and on 2 ampoules each enumerated in duplicate at the stated times, as in Example 2.

Results

|  | AA | AB | AC | BA | BB | BC |
|---|---|---|---|---|---|---|
| Opacity | 0.35 | 0.29 | 0.30 | 0.31 | 0.30 | 0.30 |
| Mg./ampoule | 0.6 | 0.5 | 0.5 | 0.5 | 0.5 | 0.5 |
| Percent moisture | 0.8 | 0.39 | 0.45 | 0.795 |  | 0.58 |
| Suspension viable cells×10⁶/ml | 156 | 112 | 121 | 60.3 | 55.8 | 82.5 |
| Viable cells×10⁶/ml after drying | 47.8 | 21.6 | 23 | 25.4 | 15.5 | 17 |
| Percent survival | 61 | 38.5 | 38 | 84.5 | 55.5 | 41.2 |

STORAGE TRIALS

| Time (months) | Viable cells×10⁶/ml. vaccine | | | | | | | | | | | |
|---|---|---|---|---|---|---|---|---|---|---|---|---|
|  | AA | | AB | | AC | | BA | | BB | | BC | |
| After freeze drying | 47.8 | | 21.6 | | 23 | | 25.4 | | 15.5 | | 17 | |
|  | 4° C. | 37° C. | 4° C. | 37° C. | 4° C. | 37° C. | 4° C. | 37° C. | 4° C. | 37° C. | 4° C. | 37° C. |
| 1 |  | 41 |  | 3.5 |  | 4.8 |  | 20.4 |  | 2.04 |  | 4.4 |
| 2 |  | 21.1 |  | 0.76 |  | 1.96 |  | 12.2 |  | 0.51 |  | 1.92 |
| 4 | 29.2 | 10.9 | 1.33 | 0.13 | 1.17 | 0.38 | 18.1 | 4.65 | 0.85 | 0.063 | 1.01 | 0.57 |

It will be seen that the results for both culture media are similar, medium A vaccine showing slightly better viability upon storage at 37° C.

EXAMPLE 4

*To Compare the New Culture Medium With Sauton-Triton Culture Medium*

A

Sauton medium:
    Asparagine ———————————————— g— 4
    Glycerol ———————————————————— ml— 40
    Citric acid ————————————————— g— 2
    $K_2HPO_4$ ——————————————————— g— 0.5
    $MgSO_4$ ————————————————————— g— 0.5
    Ferric ammonium citrate ——————— g— .05
    Triton 1/20 ————————————————— ml— 5
    Aq. dist. to 1 litre.
    pH 7.2.

B

New medium:
    Mono sodium glutamate —————————— g— 4
    L-asparagine ———————————————— g— 4
    Enzymatic digester of casein (Bacto Casitone)
                                    g— 1
    $Na_2HPO_4$ ————————————————— g— 2.5
    $K_2HPO_4$ ——————————————————— g— 1
    Ferric ammonium citrate ——————— mg— 100
    $CaCl_2$ ———————————————————— mg— 1
    $CuSO_4$ ———————————————————— mg— 0.2
    $ZnSO_4$ ———————————————————— mg— 0.2
    Meat protein hydrolysate (Peptone Oxo) — g— 20
    Triton 1/20 ————————————————— ml— 10
    Aq. dist. to 2 litres.
    pH 7.2.

Method

The media are distributed in 100 ml. quantities in mould culture flasks. These are inoculated with a 1% suspension of a 7 days old B.C.G. culture and incubated at 37° C. for 12 days. The organisms are harvested by centrifugation at 2000 r.p.m. for 35 minutes. The organisms are resuspended in dextran 5.4%, glucose 7.5%, Triton 1/4000 and filled into ampoules in 0.5 ml. amounts. They were frozen for 2 hours at −56° C. and then freeze-dried for 16 hours. After constriction of the ampoules they were secondarily dried for 20 hours and then sealed off under a vacuum of 0.0017 mm. Hg.

Comparative Keeping Trials

Both batches were stored at 4° C. and 37° C., viable counts were performed at the stated intervals by dilution in Sauton-Triton medium and enumeration of colonies after 14–16 days' incubation at 37° C. on oleic acid albumin agar containing 5% stored human blood. Two ampoules were counted from each batch. The results obtained were tabulated.

Results

|  | A | B |
|---|---|---|
| Opacity | 0.410 | 0.410 |
| Mg./ampoule | 0.7 | 0.7 |
| Suspension viable count×10⁶/ml. suspension | 57.8 | 40.3 |
| After freeze-drying, viable count×10⁶ per ml vaccine | 5.7 | 12.0 |

STORAGE TRIALS

| Viable counts×10⁶ at (months) | A | | B | |
|---|---|---|---|---|
|  | 4° C. | 37° C. | 4° C. | 37° C. |
| 1 | 1.5 | 0.029 | 9.9 | 2.9 |
| 2 | 1.03 | nil | 8.8 | 0.67 |
| 3 | 3.2 | nil | 11.0 | 0.3 |

EXAMPLE 5

*To Compare the New Culture Medium With Sauton-Triton Medium*

A. Sauton medium (as in Example 4)
B. New medium (as in Example 4)

Method

The media were distributed in 100 ml. quantities in mould culture flasks. These were inoculated with a 1% suspension of a 7 days old B.C.G. culture grown on Dubos' medium and incubated at 37° C. for 12 days. The organisms were harvested by centrifugation at 2000 r.p.m. for 35 minutes. The organisms were then resuspended in a freeze-drying medium consisting of dextran (8.3%), glucose (7.5%), and Triton 1/4000. The opacities of the suspensions were then adjusted to bring the viable counts closer together (i.e. from medium A the opacity was 0.43≡1.5 mg./ml., for medium B the opacity was 0.2≡0.8 mg./ml.). The suspensions were filled into ampoules in 0.5 ml. amounts, and deep-frozen for 2 hours at −54° C. Primary drying was then carried out for 16 hours; the ampoules were then hand constricted and secondary dried for 16 hours. Finally they were sealed off under a vacuum of 0.2 mm. Hg.

*Comparative Keeping Trials*

Viable counts were made after three weeks' storage at 4° C. and 30° C. respectively. Storage tests at an elevated temperature of 70° C. in a water bath were also carried out. The results appear below.

*Results*

|  | A | | B | |
| --- | --- | --- | --- | --- |
| Capacity Mg/ampoule | 0.43 | | 0.23 | |
| Suspension count×10⁶/ml. suspension | 0.75 47.5 | | 0.5 23.5 | |
| After freeze-drying count×10⁶/ml. vaccine | 5.9 | | 14.7 | |
| After storage at | 4° C. | 30° C. | 4° C. | 30° C. |
| Viable count×10⁶ at 3 weeks | 5.9 | 1.1 | 14.7 | 11.3 |

STORAGE AT 70° C.

| Batch | Viable count×10⁶/ml. vaccine after storage at 70° C. for (hours)— | | | | | | | |
| --- | --- | --- | --- | --- | --- | --- | --- | --- |
| | 0 | ½ | 1 | 2 | 3 | 4 | 6 | 7 | 24 |
| A | 4.1 | 0.056 | 0.038 | 0.028 | 0.928 | 0.016 | 0.0031 | 0.0033 | nil |
| B | 18.4 | 12.0 | 12.4 | 10.0 | 10.7 | <1.0 | <1.0 | <1.0 | 0.22 |

EXAMPLE 6

*Further Comparison Between a Further Glycerol-Free Culture Medium and Sauton-Triton Medium*

Culture media:
  A. Sauton medium (as in Example 4)
  B. New medium:

| | | |
| --- | --- | --- |
| Monosodium glutamate | g | 4 |
| L-asparagine | g | 4 |
| Enzymatic digest of casein (Bacto Casitone) | g | 1 |
| Na₂HPO₄ | g | 2.5 |
| KH₂PO₄ | g | 1 |
| Ferric ammonium citrate | mg | 100 |
| CaCl₂ | mg | 1 |
| CuSO₄ | mg | 0.2 |
| ZnSO₄ | mg | 0.2 |
| L-glutamine | percent | 0.2 |
| Triton 1/20 | ml | 10 |
| Aq. dist. to 2 litres. | | |

*Method*

The media were distributed in 100 ml. quantities in mould culture flasks. These were then inoculated with 1% of a one week old B.C.G. culture grown on Dubos' medium, and incubated at 37° C. for 12 days. The organisms were harvested by centrifugation at 2000 r.p.m. for 35 minutes, and were then re-suspended in a freeze-drying medium of dextran (8.3%), glucose (7.5%), and Triton 1/4000. The opacities were for medium A 0.46 (equivalent to 1.6 mg./ml.) and for medium B 0.23 (equivalent to 0.8 mg./ml.). The suspensions were filled into ampoules in 0.5 ml. amounts, and deep-frozen for 24 hours at −53° C. The ampoules were then subjected to primary freeze-drying for 16 hours, constricted, and secondarily dried for 19 hours. They were then sealed off under a vacuum of 0.02 mm./Hg.

*Comparative Keeping Trials*

Both batches were stored at 70° C. for periods of up to 24 hours. Viable counts were determined as in Example 4, the following results being obtained:

*Results*

STORAGE AT 70° C.

| Batch | Viable count × 10⁶/ml. vaccine after storage at 70° C. for (hours): | | | | | | | |
| --- | --- | --- | --- | --- | --- | --- | --- | --- |
| | 0 | ½ | 1 | 2 | 3 | 4 | 6 | 24 |
| A | 6.7 | 0.182 | 0.125 | 0.044 | 0.167 | 0.167 | 0.0049 | |
| B | 28.5 | >10.0 | >10.0 | >10.0 | >10.0 | >1.0 | >1.9 | 0.093 |

NOTE.—For the viable counts on batch B, sufficient dilutions were not made. The figures given represent the minimal number of viable organisms estimated to be present in the dilutions tested.

EXAMPLE 7

*Comparison Between a New Culture Medium and Sauton-Triton Medium*

Culture media:
  A. Sauton medium (as in Example 4)
  B. New medium (as in Example 4)

*Method*

The media were distributed in 100 ml. quantities into mould culture flasks, which were then inoculated with a 1% suspension of a week old B.C.G. culture grown on Dubos' medium. Incubation was carried on for 12 days at 37° C. and the organisms then harvested by centrifugation at 2000 r.p.m. for 35 minutes. The organisms were then re-suspended in a freeze-drying solution of dextran (8.3%), sucrose (7.5%) and Triton 1/4000. The opacities were, for medium A 0.46 (equivalent to 1.6 mg./ml.) and for medium B 0.23 (equivalent to 0.8 mg./ml.). The suspensions were then filled into ampoules in 0.5 ml. amounts, and deep-frozen for 2 hours at −54° C. Primary drying was carried on for 16 hours, the ampoules were hand constricted, and secondary drying carried on for 14 hours. The ampoules were then sealed off under a vacuum of 0.015 mm. Hg.

*Comparative Keeping Trials*

Both batches were stored at 70° C. for periods of up to 24 hours, and viable counts determined as in Example 4.

*Results*

STORAGE AT 70° C.

| Batch | Viable count×10⁶/ml. vaccine after storage at 70° C. for (hours)— | | | | | | |
| --- | --- | --- | --- | --- | --- | --- | --- |
| | 0 | ½ | 1 | 2 | 5 | 6 | 24 |
| A | 0.44 | 0.00245 | 0.00094 | 0.00012 | 0.00021 | 0.000041 | |
| B | 1.46 | 0.59 | 0.23 | 0.196 | 0.079 | 0.08 | 0.0001 |

These batches, due to the use of sucrose in the freeze-drying adjuvant, were overdried, the moisture contents of A and B being 0.257% and 0.259% respectively. This explains the low viable count immediately after freeze-drying and upon subsequent storage.

EXAMPLE 8

*To Determine the Effect of Glycerol in : (1) The Growth Medium; (2) The Freeze-Drying Medium*

Culture media:
  A. Sauton medium (as in Example 4)
  B. New medium (as in Example 4)

*Method*

4 mould culture flasks of each medium, 100 ml. medium in each, were inoculated with a 1% suspension of a week old B.C.G. culture grown on Dubos' medium.

After 14 days' incubation at 37° C. the growth in the flasks was centrifuged at 2000 r.p.m. for 30 minutes. After removal of the supernatant liquor the growth was resuspended in 30 ml. sterile distilled water. The growth was again centrifuged at 2000 r.p.m. for 30 minutes. The supernatant liquor was then completely discarded. This washing was repeated once more. As glycerol is highly miscible with water it was assumed that all traces of this substance had been removed from the surface of the cells which had been cultured in the Sauton's medium. The cells were then re-suspended as follows:

| Batch | Culture medium | F.D. solution | Opacity |
|---|---|---|---|
| 1 | A | "Mist. desiccans" | 0.48 |
| 2 | B | do | 0.24 |
| 3 | B | "Mist. desiccans" +0.02% glycerol | 0.29 |

The "Mist. desiccans" had the following composition: Bovine albumin fraction V 5%, sucrose 7.5%, L-sodium glutamate 1%, Triton 0.025% in distilled water.

0.5 ml. of batches 1, 2 and 3 were filled into ampoules, which were deep-frozen for 90 minutes at −50° C. They were primarily dried in a freeze drier overnight, constricted and secondarily dried for 1 hour. The ampoules were sealed off under a vacuum of 0.03 mm. Hg.

*Comparative Keeping Trials*

The ampoules were subjected to a temperature of 70° C. in a water bath. Viable counts were carried out at the stated intervals by the method described in Example 4.

*Results*

| Batch | Suspension count × $10^3$ per ml. susp. | Percent survival on freeze drying | Viable count × $10^6$/ml. vaccine after storage at 70° C. for (hours)— | | | | |
|---|---|---|---|---|---|---|---|
| | | | 0 | ½ | 1 | 3 | 6 |
| 1 | 77.3 | 7.14 | 2.76 | 0.018 | 0.013 | 0.0036 | 0.002 |
| 2 | 61.9 | 44.6 | 13.8 | 12.92 | 8.83 | 10.45 | 6.42 |
| 3 | 41.7 | 79.7 | 16.6 | 14.5 | 12.7 | 11.7 | 10.2 |

*Example 9*

This example illustrates in greater detail the actual production of B.C.G. vaccine on a new medium.

Culture medium:
Mono sodium glutamate ---------------- g-- 4
L-asparagine ------------------------- g-- 4
Enzymatic digest of casein (Bacto Casitone) -------------------------- g-- 1
$Na_2HPO_4$ ------------------------------ g-- 2.5
$KH_2PO_4$ ------------------------------- g-- 1
Ferric ammonium citrate -------------- mg-- 100
$CaCl_2$ --------------------------------- mg-- 1
$CuSO_4$ --------------------------------- mg-- 0.2
$ZnSO_4$ --------------------------------- mg-- 0.2
L-glutamine ------------------------- g-- 4
Triton 1/20 ------------------------- ml-- 10
Aq. dist. to 2 litres.

*Method*

100 ml. quantities of this medium were filled into 2 litre mould culture flasks and autoclaved at 10 lb. pressure for 20 minutes. The flasks were then inoculated with a 1% suspension of a 7 day old Dubos' culture of B.C.G.

The cultures were incubated at 37° C. for 12 days. The bacterial cells were separated by centrifugation at 2000 r.p.m. for 35 minutes and then re-suspended in an aqueous solution of dextran (8.3%) glucose (7.5%) and Triton 1/4000.

The opacity of the suspension was determined on a Hilger Spekker photoelectric absorption meter and, by reference to a calibrated curve, adjusted to give the required moist weight per ampoule of vaccine.

0.5 ml. quantities of the vaccine were then filled into ampoules and frozen at −55° C. for 90 minutes. The ampoules were dried on a high vacuum primary freeze-drier for 16 hours, constricted to facilitate sealing and transferred to a high vacuum secondary freeze-drier for a further 16 hours. They were then sealed under vacuum (0.02 mm. Hg).

We claim:
1. A process for the production of a freeze-dried B.C.G. vaccine comprising culturing B.C.G. organisms in B.C.G. vaccine comprising culturing B.C.G. organisms in a nutrient medium therefor containing a source of nitrogen and carbon, said medium being free from glycerol, monosaccharides, sugar alcohols, polysaccharides containing a carbonyl group and polysaccharides metabolised by the organisms to a carbonyl group-containing compound and freeze-drying the B.C.G. organisms so produced.

2. A process as claimed in claim 1 in which the medium is one wherein the essential nitrogen and carbon requirements of the organisms are provided by at least one member selected from the group consisting of amino-acids, polypeptides and protein hydrolysates.

3. A process as claimed in claim 1 in which the culture is conducted under submerged conditions.

4. A process as claimed in claim 1 in which the medium contains at least one member selected from the group consisting of an enzymatic digest of casein, a meat protein hydrolysate, and a meat extract.

5. A process as claimed in claim 1 in which the medium contains a non-hydrolysable wetting agent.

6. A process as claimed in claim 5 in which said wetting agent is a polyoxyethylene ether of a long-chain alcohol.

7. A process as claimed in claim 1 in which the medium is buffered to a pH between 5.5 and 8.5.

8. A process as claimed in claim 7 in which the medium contains disodium hydrogen phosphate and potassium dihydrogen phosphate as buffer salts.

9. A process as claimed in claim 1 in which the medium contains L-asparagine.

10. A process as claimed in claim 1 in which the medium contains at least one member selected from the group consisting of monosodium glutamate and L-glutamine.

References Cited in the file of this patent
UNITED STATES PATENTS
2,908,614    Muggleton ------------- Oct. 13, 1959
OTHER REFERENCES
Ungar et al.: "Preparation and Properties of a Freeze-Dried B.C.G. Vaccine of Increased Stability," British Medical Journal, vol. 11, pp. 1086–1089, October 27, 1962.